(12) United States Patent
Seibaek

(10) Patent No.: US 8,627,927 B2
(45) Date of Patent: Jan. 14, 2014

(54) LEG LEVELLING

(75) Inventor: Henrik Seibaek, Copenhagen Ø (DK)

(73) Assignee: EYE2Z APS, Roskilde (DK)

( * ) Notice: Subject to any disclaimer, the term of this patent is extended or adjusted under 35 U.S.C. 154(b) by 35 days.

(21) Appl. No.: 13/264,307

(22) PCT Filed: Apr. 14, 2010

(86) PCT No.: PCT/EP2010/054870
§ 371 (c)(1),
(2), (4) Date: Oct. 13, 2011

(87) PCT Pub. No.: WO2010/119053
PCT Pub. Date: Oct. 21, 2010

(65) Prior Publication Data
US 2012/0037768 A1 Feb. 16, 2012

(30) Foreign Application Priority Data

Apr. 14, 2009 (DK) .................................. 2009 00483
Apr. 14, 2009 (WO) ................ PCT/DK2009/000093

(51) Int. Cl.
*E06C 1/00* (2006.01)

(52) U.S. Cl.
USPC ..................... 182/202; 248/188.3; 248/188.5; 248/163.1

(58) Field of Classification Search
USPC ................ 248/163.1, 188.5, 407, 408, 188.3; 108/146; 182/202
See application file for complete search history.

(56) References Cited

U.S. PATENT DOCUMENTS

| | | | | |
|---|---|---|---|---|
| 3,090,466 A | * | 5/1963 | Wright | 182/202 |
| 3,258,085 A | * | 6/1966 | McCarty | 182/202 |
| 3,794,141 A | | 2/1974 | Sturm | |
| 3,880,388 A | * | 4/1975 | Beguin | 248/188.3 |
| 3,954,241 A | * | 5/1976 | Carlson | 248/188.3 |
| 4,014,406 A | * | 3/1977 | Easton | 182/204 |
| 4,095,671 A | | 6/1978 | Forristall et al. | |
| 4,497,390 A | * | 2/1985 | Wilson | 182/202 |
| 4,637,581 A | * | 1/1987 | Wong | 248/188.3 |
| 4,770,275 A | * | 9/1988 | Williams | 182/202 |

(Continued)

FOREIGN PATENT DOCUMENTS

| | | |
|---|---|---|
| DE | 810 179 C | 8/1951 |
| EP | 0 006 230 A | 1/1980 |

(Continued)

*Primary Examiner* — Terrell McKinnon
*Assistant Examiner* — Daniel J Breslin
(74) *Attorney, Agent, or Firm* — Muncy, Geissler, Olds & Lowe, PLLC

(57) ABSTRACT

A device (10), such as a ladder, scaffold, piece of furniture or a support for any other appliance has at least two legs (12;14), each of which has a slidable leg part (30;32) slidably positioned with respect to another part (18;20) of the device to form a leg having an adjustable length. A locking structure (34;36) is arranged to prevent movement of each of the slidable leg parts (30;32) with respect to said other part (18;20) of the device in a locked state of the locking structure (34;36), and to allow movement of each of the slidable leg parts (30;32) with respect to said other part (18;20) of the device in an unlocked state of the locking structure (34;36). A flexible member (38) interconnects the slidable leg parts (30;32) and is arranged such that it pulls the locking structure (34;36) into the unlocked position when strained under the action of gravity acting on at least one of the slidable leg parts (30;32).

13 Claims, 12 Drawing Sheets

(56) References Cited

U.S. PATENT DOCUMENTS

| | | | | |
|---|---|---|---|---|
| 5,007,503 | A | * | 4/1991 | Sturm ............................ 182/202 |
| 5,074,378 | A | * | 12/1991 | Studer ........................... 182/201 |
| 6,237,718 | B1 | * | 5/2001 | Schwarzel ..................... 182/205 |
| 7,104,203 | B2 | * | 9/2006 | Lo .................................. 108/147 |
| 7,341,164 | B2 | * | 3/2008 | Barquist et al. ............... 220/629 |
| 8,065,965 | B2 | * | 11/2011 | Pearson ......................... 108/132 |

| | | |
|---|---|---|
| 2005/0279261 | A1 | 12/2005 Lo |
| 2005/0279750 | A1 | 12/2005 Barquist et al. |

FOREIGN PATENT DOCUMENTS

| | | |
|---|---|---|
| GB | 196 469 A | 4/1923 |
| JP | 2004-257051 A | 9/2004 |
| WO | WO 03/086148 A1 | 10/2003 |

* cited by examiner

LEG LEVELLING

TECHNICAL FIELD

The present invention relates to a device having a set of legs for supporting the device on a supporting surface, such as a substantially horizontal, yet uneven supporting surface, the set of legs including legs with a levelling mechanism that adapts the individual lengths of the legs to an uneven surface and locks the legs when all of the legs are supported by the surface. In one embodiment, the legs may be telescoping legs. The device may constitute any kind of device in need of a length-adjustable leg or support mechanism, such as a ladder, scaffolding system, a piece of furniture, a chair, coach, table, a camper, grill, container, container frame, lamp, beamer, monitor, television, a piece of HIFI equipment, a computer or a computer cabinet, domestic appliances, washing machine, tumble drier, dish washer, refrigerator, locker, bookcase, drawer module, etc. The device may be provided as a base element to be placed underneath a further device to be supported on uneven ground, such as one of the aforementioned devices.

BACKGROUND OF THE INVENTION

It is a well-known problem to position a device in a desired stable position on an uneven surface. The problem is often solved by placing one or more supporting plates or blocks underneath one leg of the device to compensate for the unevenness of the supporting surface, for example underneath one leg of a table or underneath one leg of a ladder or a scaffolding system. Often, the extra support is not secured underneath the leg, and the solution is not safe with a high probability that the device may tilt at some point in time with the consequence that the supported person or goods are put at risk.

There hence exists a need for a device that may be placed stable and preferably level on an uneven surface in an easy and automatic way.

DESCRIPTION OF THE INVENTION

Embodiments of the present invention solves the problem of placing a device on an arbitrary surface, such as a substantially horizontal, yet uneven surface. The device may be placed either horizontally or at a certain inclination, as the respective lengths of at least two of the legs of the device are adjustable according to the wish and need of the user of the device.

In a first aspect the invention provides a device having
a set of legs for supporting the device, the set of legs including at least two legs, each of which has a slidable leg part slidably positioned with respect to another part of the device to form a leg having an adjustable length;
a locking structure arranged to prevent movement of each of the slidable leg parts with respect to said other part of the device in a locked state of the locking structure, and to allow movement of each of the slidable leg parts with respect to said other part of the device in an unlocked state of the locking structure,
a flexible member interconnecting the slidable leg parts, the flexible member being arranged such that it pulls the locking structure into the unlocked position when strained.

The flexible member is preferably arranged such that it is strained when a free end of at least one of the slidable leg parts is unsupported. The flexible member may preferably be strained by gravity when a free end at least one of the slidable leg parts is unsupported. In preferred embodiments, the force required to strain the flexible member derives from gravity acting on the weight of at least one of the slidable leg parts.

It will hence be appreciated that the present invention provides a device with a leg assembly, the length of which is automatically adjustable in the sense that the lengths of the legs may vary as long as at least one of the slidable leg parts hangs freely and confers load on the flexible member under action of gravity. In preferred embodiments of the invention, the flexible member can be strained only under the action of gravity action on at least one of the slidable leg parts and/or on elements connected thereto or integrated therewith. Hence, in such embodiments, the device comprises no separate means for adjusting the lengths of the legs, which are hence adjustable without the need for a handle, motor drive or other equipment for straining the flexbile member.

The locking structure may comprise a one-way locking mechanism, which is arranged to lock the slidable leg part in relation to said other part of the device when the flexbile member is unstrained and to release the mutual fixation of the slidable leg part and the other part of the device when the flexbile member is strained, i.e. when a free end of at least one of the slidable leg parts is unsupported to allow that leg part to hang freely and confer load on the flexible member under the action of gravity acting on that slidable leg part. The locking structure may for example include one or more arms or plates secured to respective free ends of the flexbile member and hinged along one of their ends or edges to respective ends of the slidable leg parts opposite to the aforementioned free ends of the slidable leg parts. In the locked state of the locking structure, i.e. when the flexible member is unstrained, that end of the arms or plates, which is opposite to the hinged ends or edges, may engage a surface of said other part of the device, e.g. a base structure or a non-slidable leg part thereof. In the unlocked state of the locking structure, i.e. when the flexible member is strained, that end of the arms or plates, which are opposite to the hinged ends or edges, is released from its engagement with said other part of the device to allow at least one of the slidable leg parts to slide freely with respect to the other part of the device. The stroke of the free end of the hinged arms or plates defines the distance, which each slidable leg part may slide after all of the slidable leg parts have been placed on ground. The stroke of each arm or hinge is in turn dependent on the location of the point of attachment of the flexible member to the arm or plate.

The locking structure is preferably a purely mechanical mechanism, which requires no electronic control for its operation in order to adjust the length of the respective legs. However, electronic means may be provided for operating the locking structure or for assisting its operation. For example, an electronic control system may be provided, which is coupled to load and/or contact sensors as well as electronic locking means, e.g. electromagnets for achieving the desired locking and unlocking function.

It will be understood that the flexible member is preferably arranged such that it is strained when a free end of at least one of the slidable leg parts is unsupported. In preferred embodiments of the invention, the flexible member is strained by gravity when a free end of at least one of the slidable leg parts is unsupported. In this case, strain in the flexiable member is brought about by gravity acting on the weight of at least one of the slidable leg parts. Preferably, the flexible member is arranged such that it is unstrained when the respective free ends of all of the slidable leg parts rest on a supporting surface, i.e. when the slidable leg parts are supported and only subjected to the force of gravity. The locking structure is preferably arranged such that it is in its locked state when the flexible member is unstrained, for example when the at least two slidable leg parts rest on a supporting surface.

Said other part of the device, relative to which the slidable leg part is axially slidable when the locking structure is in its unlocked state, and relative to which the slidable leg part is fixed when the locking structure is in its locked state, may be provided as any element capable of being engaged by the locking structure. For example, said other part may include a fixed support, such as a base of the device, or a fixed leg member. The other part may e.g. include a part of a support frame or base member of a ladder, container, or any other piece of equipment in need of a support with length-adjustable legs. It should be understood that the slidable leg part may be slidably arranged with respect to different parts of the device, e.g. with respect to respective stationary leg parts or with respect to different parts of a base frame of the device.

The locking structure may comprise at least one locking element, which is connected to the flexible member, the locking element being arranged to enter into a locked engagement with said other part of the device under the action of gravity acting on the locking element when the flexible member is unstrained, and the locking element being further arranged to be pulled out of said locked engagement when the flexible member is strained. Preferably at least one such locking element is provided per leg. The locking element may e.g. comprise a plate or an arm hinged at one end of the respective slidable leg parts, with the flexible element interconnecting the at least two locking elements, so that it falls into a locked engagement with said other part of the device when the flexible member is unstrained, and so that the flexible member is pulled out of the locked engagement when the flexible member is strained. In other embodiments, the locking structure may include magnetic means or other mechanical elements for achieving the desired locking function.

In one embodiment, each of said legs is a telescoping leg, wherein said other part of the device is an outer leg member of said telescoping leg. The outer member may extend along an axis and having a wall at least partly enclosing a cavity inside the outer member. Each of the slidable leg parts may form an inner member slidably positioned within the cavity of the outer member to form the telescoping leg together with the outer member. Alternatively, the outer member may be slidable relative to the inner member, which in that case is fixed.

The locking structure may comprise at least two movable locking members, each locking member being connected to or integrated with a respective one of the slidable leg parts, wherein the flexible member interconnects each of the movable locking members. It should be understood that each of the movable locking members may constitute an embodiment of the at least one locking element described above.

Each of the locking members may be mounted in the telescoping leg in such a way that:
  each of the at least one movable locking member, in a locked position, prevents movement of the inner member further into the cavity of the outer member, and
  each of the at least one movable locking member, in an unlocked position, does not prevent movement of the inner member further into the cavity of the outer member.

In all embodiments of the locking structure, more than one locking element or more than one locking member may be provided per leg part.

In embodiments of the invention including a telescopic leg assembly as described above, gravity urges the outer member downwardly seeking to insert the inner member further into the cavity of the outer member, however, when the locking member is in the locked position, movement of the inner member further into the cavity of the outer member is prevented and as a result the device is firmly supported on the surface.

In order to automatically put each of the at least one locking member in the locked position, when the respective telescoping leg is supported by the surface, embodiments of the device is further provided with the flexible member interconnecting each of the at least one locking members of the at least two telescoping legs and pulling each of the at least one locking members of the at least two telescoping legs into the unlocked position when strained.

Thus, when the flexible member is strained, the at least one locking members of the at least two telescoping legs are kept in their unlocked positions and the inner members are free to move with relation to the respective outer members of the at least two telescoping legs thereby adjusting the lengths of the at least two telescoping legs. When the flexible member is not strained, the at least one locking members of the at least two telescoping legs may be in their locked positions so that the inner members cannot move with relation to the respective outer members of the at least two telescoping legs thereby keeping the lengths of the at least two telescoping legs fixed so that the device can be firmly supported by the surface. The flexible member may be strained when at least one of the at least two telescoping legs is unsupported.

The locking structure may be connected to the respective slidable leg parts so that the flexible member is strained by gravity when at least one of the at least two slidable leg parts is unsupported. Thus, when the device is held above the surface, such as the ground, with a lifting force, gravity pulls the slidable leg par(s) downwardly thereby straining the flexible member so that the locking structure is kept in its unlocked state whereby the slidable leg parts can move relative to said other part of the device so that the length of the slidable leg part abutting the surface first, when the device is lowered towards the surface, is automatically decreased until all of the at least two slidable legs abut the surface. At this point, further lowering of the device towards the supporting surface will relax the flexible member so that the locking structure moves into its locked positions preventing further changes of the lengths of the at least two slidable legs so that with no lifting force, i.e. the device is only subjected to the force of gravity, the device is firmly supported by the set of legs, since the lengths of the at least two slidable leg parts have been automatically adjusted to desired lengths and are prevented from further adjustments by the locked locking structure. The length of the at least two legs may be readjusted by exerting a lifting force on the device again, lifting the device up from the supporting surface so that gravity may pull the slidable members downward thereby again straining the flexible member and unlocking the locking structure and repeating the positioning of the device on the supporting surface as described above.

The locking structure may be connected to the slidable leg part in such a way that it is moved from an unlocked position to the locked position by the force of gravity with the flexible member is not strained. Thus, during positioning of the device on the supporting uneven surface, the length of each of the at least two leg parts is automatically adjusted to a length that compensates for the unevenness of the supporting surface, and when the device is left to rest on the supporting surface, i.e. no lifting force is exerted on the device, each of the at least two slidable leg parts are automatically locked so that further changes of the length of each of the at least two slidable leg parts are prevented whereby the device is firmly and safely supported by the set of legs and the supporting surface.

It should be noted that the final orientation of the device on the supporting surface with no lifting force exerted on the device, is determined by the orientation of the device when the last of the at least two slidable leg parts touches the supporting surface resulting in locking of the locking structure upon further lowering of the device towards the supporting surface.

Thus, the device may be placed in a desired orientation, such as inclination, such as in level, by lifting the device and placing it with the desired orientation on the supporting surface. It should be noted that the flexible member carries no load when the device rests on the supporting surface, i.e. when no lifting force is exerted on the device.

When the device is held above the supporting surface, the flexible member may carry the weight of the inner member and the locking member of each unsupported telescoping leg. Preferably, the flexible member remains strained until all of the at least two slidable leg parts are supported by the supporting surface.

Preferably, the flexible member is not strained when all of the at least two slidable leg parts are supported.

The flexible member comprise a string, a chain, a wire or the like. It may for example be provided as a string of balls of spheres.

Preferably, each of the at least one locking member, in the locked position, is wedged between the slidable leg part and said other part of the device, e.g. between the inner member and the wall of the outer member of a telescoping leg. For example, the at least one locking member may be rotatably or hingeably connected to the respective inner member so that when the flexible member is strained, the at least one locking member is rotated out of wedging engagement (locking position) with said other device and into an unlocked position.

The at least one locking member may rotate further into a plurality of unlocked positions. When the flexible member becomes unstrained during positioning of the device on the supporting surface, the at least one locking member rotates back into the locked position of wedging engagement with the respective other part of the device.

The wall of the outer member of at least one of the at least two telescoping legs may have an inner surface facing each of the at least one locking member with a roughness facilitating wedging engagement between each of the at least one locking member and the inner surface of the wall. Generally, the roughness of that surface of said other part of the device, which is engaged by the locking structure may be configured to facilitate the engagement of the locking structure with that surface.

The roughness may be constituted by alternating protrusions and recesses of the surface. The roughness may be constituted by a ribbed surface, such as a serrated surface, e.g. a serrated inner surface of the outer member or of said other part of the device.

Alternatively, the desired roughness, e.g. the roughness of said inner surface, may be provided by insertion of a coil spring in the cavity of the outer member that is fastened to the wall in the cavity in such a way that the inner member is slidably positioned inside the coil spring, and wherein each of the at least one locking member, in the locked position, is wedged between the inner member and the coil spring. Alternatively, the coil spring may be provided around a stationary leg part forming said other part of the device.

At least one of the at least two slidable leg parts, e.g. telescoping legs, may comprise a lock assist member that interconnects the flexible member and the at least one locking member. The set of legs may include any number of leg parts suitable for supporting the device in question, such as two, three, four, six, eight, nine, twelve, fifteen, sixteen, thirty-two, etc., telescoping legs.

The device may be a furniture, such as a table, a chair, a bed, etc., a ladder, a camper, a trailer, a container, such as a cargo container, a container frame, a chopper, a grill, etc. The device may be a crane, an excavator, or any machine for construction work, such as for building, digging, etc. The device may be a tripod, such as a tripod for a camera, a stand, a workbench, a projector, a mobile toilet, a barrow, etc. The device may be made of metal, such as steel. Preferably, at least the outer member and the inner member of the at least two telescoping legs are made of metal, such as steel. Preferably, the at least one moveable locking member is made of metal such as hardened steel.

Preferably, all of the at least two slidable leg parts, e.g. telescoping legs, are loaded evenly. This may be ensured by the at least two telescoping leg being automatically adjusted in length to fit the outline of the support.

A device according to the present invention may comprise at least two moveable locking members. Different locking members in the same slidable leg part may be oriented in different directions, e.g. seen from above, i.e. seen projected into a plane perpendicular to the direction of movement of the inner member.

A leg-length adjusting mechanism may be provided for automatically adjusting, e.g. equalizing the respective lengths of the legs of the device, when the free ends of the slideable leg parts are unsupported. The leg-length adjusting mechanism may for example respective compression springs at each of the slidable leg parts for forcing all of the slidable leg parts to equal positions relative to said other part of the device when the free ends of the sildable leg parts are unsupported, i.e. when they do not rest on ground or another supporting surface.

In a further aspect, a device is provided having a set of legs for supporting the device. The set of legs may include a first and a second slidable leg, such as a first and a second telescoping leg each having a first and second member. A slidable leg member, such as e.g. the second leg member of the telescoping leg, may be slidably connected to another part of the device, e.g. the first member, along an axis to at least partly form the length-adjustable leg, e.g. the telescoping leg which may be defined by the first and second leg members. Further, the device may comprise a first moveable locking member mounted in one part of the device, e.g. the stationary part or stationary first leg member, and a second moveable locking member mounted in the slidable leg part, e.g. the second telescoping leg member, in such a way that the first and second locking members, in a locked position, prevent movement of the slidable parts of the legs in a first direction along the axis, and in such a way that the first and second locking members, in an unlocked position, allow movement of the slidable members in the first direction. The device may further comprise a flexible member interconnecting the first and the second locking members and pulling the first and the second locking members into the unlocked position when strained. An uneven surface of the wall to be engaged by the locking members, e.g. an inner wall of the telescopic leg assembly, may be provided by welding the outer member, e.g. from outside the outer member.

In a further aspect, the invention provides a device having a set of legs for supporting the device, the set of legs including at least two telescoping legs, each of which has
   an outer member extending along an axis and having a wall
     at least partly enclosing a cavity inside the outer member, an inner member slidably positioned within the cavity of the outer member to form the telescoping leg together with the outer member, and at least one moveable locking member mounted in the telescoping leg in such a way that each of the at least one moveable locking member, in a locked position, prevents movement of the inner member further into the cavity of the outer member, and each of the at least one moveable locking member, in an unlocked position, does not prevent movement of the inner member further into the cavity of the outer member, the device further comprising a flexible member interconnecting each of the at least one locking members of the at least two telescoping legs and pulling each of the at least one locking members of the at least two telescoping legs into the unlocked position when strained.

DESCRIPTION OF THE DRAWINGS

Some of the above and other features and advantages of the above aspects of the present invention will become readily apparent to those skilled in the art by the following detailed description of exemplary embodiments thereof with reference to the attached drawings, in which.

The figures are schematic and simplified for clarity, and they may merely show details which are essential to the understanding embodiments of the invention, while other details may have been left out. Throughout, the same reference numerals are used for identical or corresponding parts.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of embodiments of the invention to those skilled in the art.

The device may comprise a connector element connecting the first telescoping leg and the second telescoping leg. The connector element may be a tubular, hollow element. The connector element may accommodate a part of the flexible member.

The device may comprise one or more guiding elements, e.g. a first and/or a second guiding element. A guiding element may comprise a fixed or a loose pulley.

The device may comprise a first spring member in the first telescoping leg, the first spring member being arranged to apply a force on the second or inner member in a second direction opposite the first direction in relation to the first or outer member. Thereby, the first spring member may contribute to straining the flexible member in an unloaded state.

The device may comprise a second spring member in the second telescoping leg, the second spring member being arranged to apply a force on the second or inner member in a second direction opposite the first direction in relation to the first or outer member.

The first spring member and/or the second spring member may provide a strained flexible member in an unloaded state of the device.

The device may comprise one or more locking spring members to move the locking members from unlocked to locked position when the flexible member is unstrained or relaxed.

Figure 1:
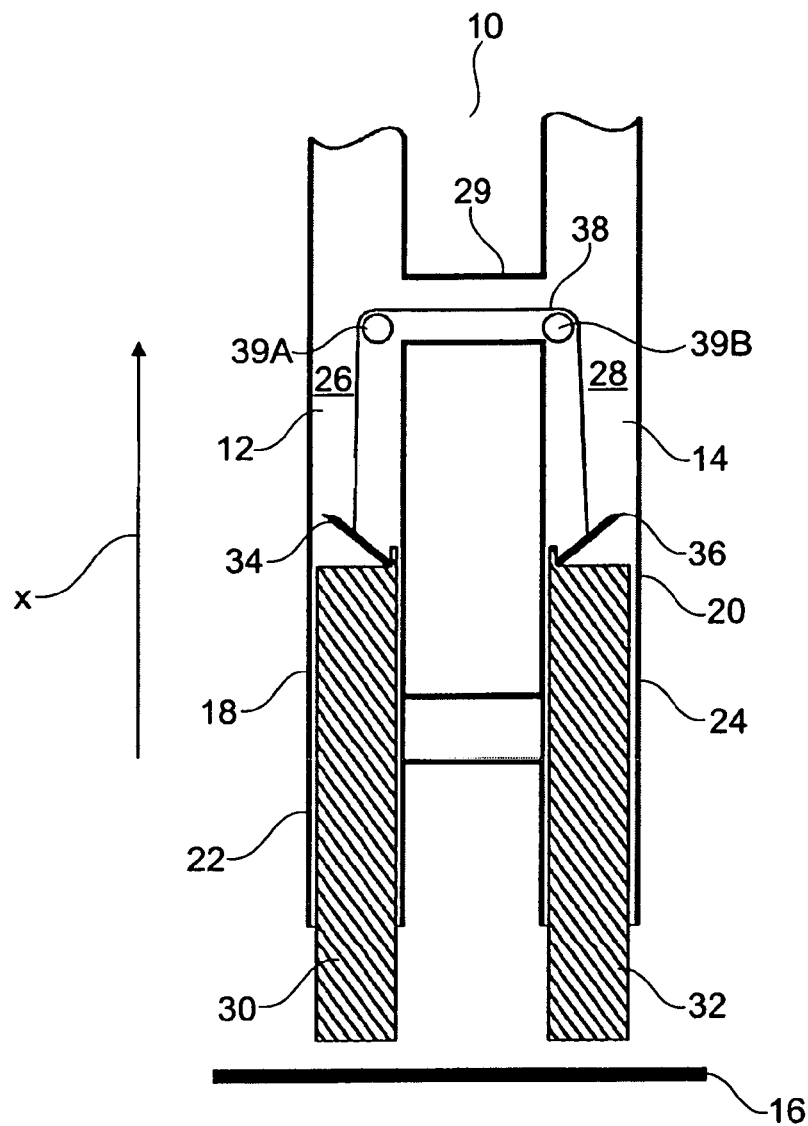
FIG. 1 schematically illustrates an embodiment of an unsupported device according to the present invention, FIG. 2 schematically illustrates the device of FIG. 1 supported by an uneven surface, FIG. 3 schematically illustrates another unsupported device, FIG. 4 schematically illustrates yet another unsupported device, FIG. 5 schematically illustrates a detail of a supported device, FIG. 6 schematically illustrates a detail of an unsupported device, FIG. 7 schematically illustrates the positioning of a device on an uneven surface, FIG. 8 schematically illustrates a detail of telescoping leg with two movable locking members in the locked position, FIG. 9 schematically illustrates the detail of FIG. 8 in the unlocked position.

FIG. 1 schematically illustrates a device 10 in the form of a ladder 10 with a first telescoping leg 12 and a second telescoping leg 14 for supporting the device 10 on a supporting surface 16. Each of the telescoping legs 12, 14 comprises a first or outer member 18, 20 extending along an axis X and having a wall 22, 24 at least partly enclosing a cavity 26, 28. The first members 18, 20 are connected by a connector element 29. Further, the device comprises a second or inner member 30, 32 slidably positioned within the respective cavity 26, 28 of the respective outer member 18, 20 to form the first telescoping leg 12 and the second telescoping leg 14, respectively.

In order to lock the inner member 30, 32 in a specific position with relation to the respective outer member 18, 20, at least one moveable locking member 34, 36 is mounted in the respective telescoping leg 12, 14 in such a way that each moveable locking member 34, 36, in a locked position (see FIG. 2), prevents movement of the inner member 30, 32 in the first direction indicated by arrow X, i.e. further into the respective cavity 26, 28 of the respective outer member 18, 20. Further, each moveable locking member 34, 36, in an unlocked position as illustrated in FIG. 1, allows movement of the respective inner member 30, 32 in the first direction, i.e. further into the respective cavity 26, 28 of the respective outer member 18, 20.

The first locking member 34 is hingeably and moveably connected to the inner member 30 and the second locking member 36 is hingeably and movably connected to the inner member 32.

Further, the device 10 comprises a flexible member 38 interconnecting the first locking member 34 and the second locking member 36. In the unloaded position as illustrated in FIG. 1, the strained flexible member 38 ensures that the locking members 34, 36 are kept in the unlocked state. The flexible member 38 is guided in the cavities 26, 28 and in the hollow connector element 29 by a first guiding element 39A and a second guiding element 39B.

Figure 2:
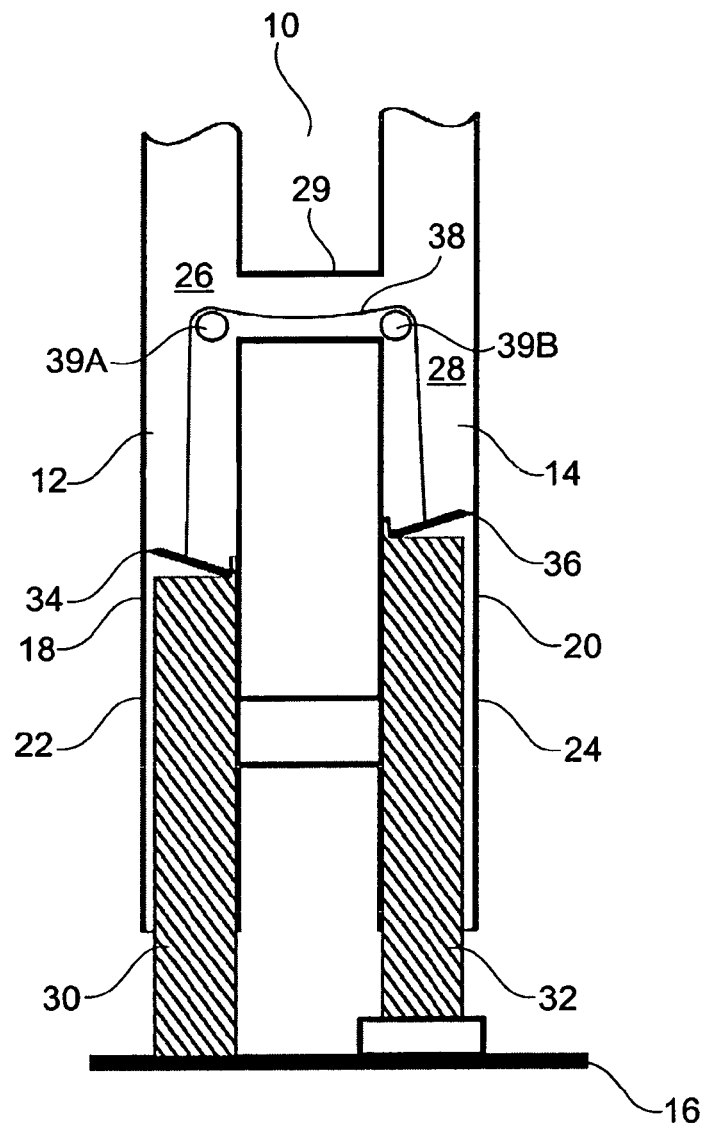

FIG. 2 illustrates the device 10 in a loaded position or state. In the loaded position where all telescoping legs are supported on the surface, the flexible member 38 is unstrained or relaxed causing the first locking member 34 and the second locking member 36 to move into locked position. The relaxed flexible member 38 in the form of a string has one end attached to the first locking member 36 and one end attached to the second locking member 38, allowing the locking members 34, 36 to enter the locked position. In the locking position, the first locking member 34 engages the inner surface of the wall of the outer member 22. In the loaded position, the respective telescoping leg 12, 14 is supported by the uneven surface 16. Thus, when the flexible member 38 is strained, the locking members 34, 36 of the two telescoping legs 12, 14 are kept in their unlocked positions shown in FIG. 1, and the inner members 30, 32 are free to move with relation to the respective outer members 18, 20 of the two telescoping legs 12, 14 thereby adjusting the lengths of the two telescoping legs 12, 14. When the flexible member 38 is not strained, the locking members 34, 36 of the two telescoping legs 12, 14 may be in their locked positions shown in FIG. 2 so that the inner members 30, 32 cannot move with relation to the respective outer members 18, 20 of the two telescoping legs 12, 14 thereby keeping the lengths of the two telescoping legs 12, 14 fixed so that the device 10 is firmly supported by the uneven surface 16 as shown in FIG. 2. As shown in FIG. 1, the flexible member 38 may be strained when at least one of the two telescoping legs 12, 14 is unsupported.

As also shown in FIGS. 1 and 2, the locking members 34, 36 are hingeably connected to the respective inner member 30, 32 so that the flexible member 38 is strained by gravity when at least one of the two telescoping legs 12, 14 is unsupported. Thus, when the device 10 is held above the surface as shown in FIG. 1 with a lifting force, gravity pulls the outer members 30, 32 downward towards the surface 16 thereby straining the flexible member 38 so that the locking members 34, 36 are kept in their unlocked positions as shown in FIG. 1 whereby the inner members 30, 32 can move with relation to the respective outer members 18, 20 of the two telescoping legs 12, 14 whereby the length of the telescoping leg abutting the surface 16 first, when the device 10 is lowered towards the surface 16, is automatically decreased until both telescoping legs 12, 14 abut the surface. Subsequently, further lowering of the device 10 towards the supporting surface 16 will relax the flexible member 38 so that the moveable locking members 34, 36 move into their locked positions as shown in FIG. 2 wedging between the respective inner member 30, 32 and the respective wall 18, 20 preventing further changes of the lengths of the two telescoping legs 12, 14 so that with no lifting force, i.e. the device 10 is only subjected to the force of gravity, the device 10 is firmly supported by the legs 12, 14, since the lengths of the two telescoping legs 12, 14 have been automatically adjusted to desired lengths and are prevented from further adjustments by the locked locking members 34, 36. The length of the two telescoping legs 12, 14 may be readjusted by exerting a lifting force on the device 10 again, lifting the device 10 up from the supporting surface 16 so that gravity may pull the inner members 30, 32 downward and out of the respective outer members 18, 20 thereby again straining the flexible member 38 and putting the moveable locking members 34, 36 in their unlocked positions of FIG. 1 and repeating the positioning of the device 10 on the supporting surface 16 as described above.

It should be noted that in the illustrated exemplary device 10, the moveable locking members 34, 36 are hingeably or rotateably connected to the respective inner member 30, 32 in such a way that the moveable locking members 34, 36 are moved from an unlocked position shown in FIG. 1 to the locked position shown in FIG. 2 by the force of gravity when the flexible member 38 is not strained. Each of the locking members 34, 36, is wedged in the locked position between the respective inner member 30, 32 and the respective wall 22, 24 of the respective outer member 18, 20. When the flexible member 38 is strained, the locking members 34, 36 are rotated out of wedging engagement between the respective inner member 30, 32 and the respective wall 18, 20 and into an unlocked position as shown in FIG. 1. As shown in FIG. 1, the locking members 34, 36 may rotate further into a range of unlocked positions.

Thus, during positioning of the device 10 on the supporting uneven surface 16, the length of each of the two telescoping legs 12, 14 is automatically adjusted to a length that compensates for the unevenness of the supporting surface 16 as shown in FIG. 2, and when the device 10 is left to rest on the supporting surface, i.e. no lifting force is exerted on the device 10, each of the two telescoping legs 12, 14 are automatically locked so that further changes of the length of the two telescoping legs 12, 14 are prevented whereby the device 10 is firmly and safely supported by the set of legs 12, 14 and the supporting surface 16.

It should be noted that the final orientation of the device 10 on the supporting surface 16 with no lifting force exerted on the device 10, is determined by the orientation of the device 10 when the last of the two telescoping legs 12, 14 touches the supporting surface 16 resulting in locking of the moveable locking members 34, 36 upon further lowering of the device 10 towards the supporting surface 16.

Thus, the device 10 may be placed in a desired orientation, such as inclination, such as in level, by lifting the device 10 and placing it with the desired orientation on the supporting surface 16.

It should be noted that the flexible member 38 carries no load when the device 10 rests on the supporting surface 16, i.e. when no lifting force is exerted on the device. When the device 10 is held above the supporting surface 16 as shown in FIG. 1, the flexible member 38 carries the weight of the unsupported inner members 30, 32 of the telescoping legs 12, 14, the moveable locking members 34 and 36 and possible lock assist members (not shown). The flexible member 38 remains strained until all telescoping legs 12, 14 are supported by the supporting surface 16 as shown in FIG. 1.

The flexible member 38 is not strained when all of telescoping legs 12, 14 are supported by the supporting surface 16 as shown in FIG. 2.

Figure 3:
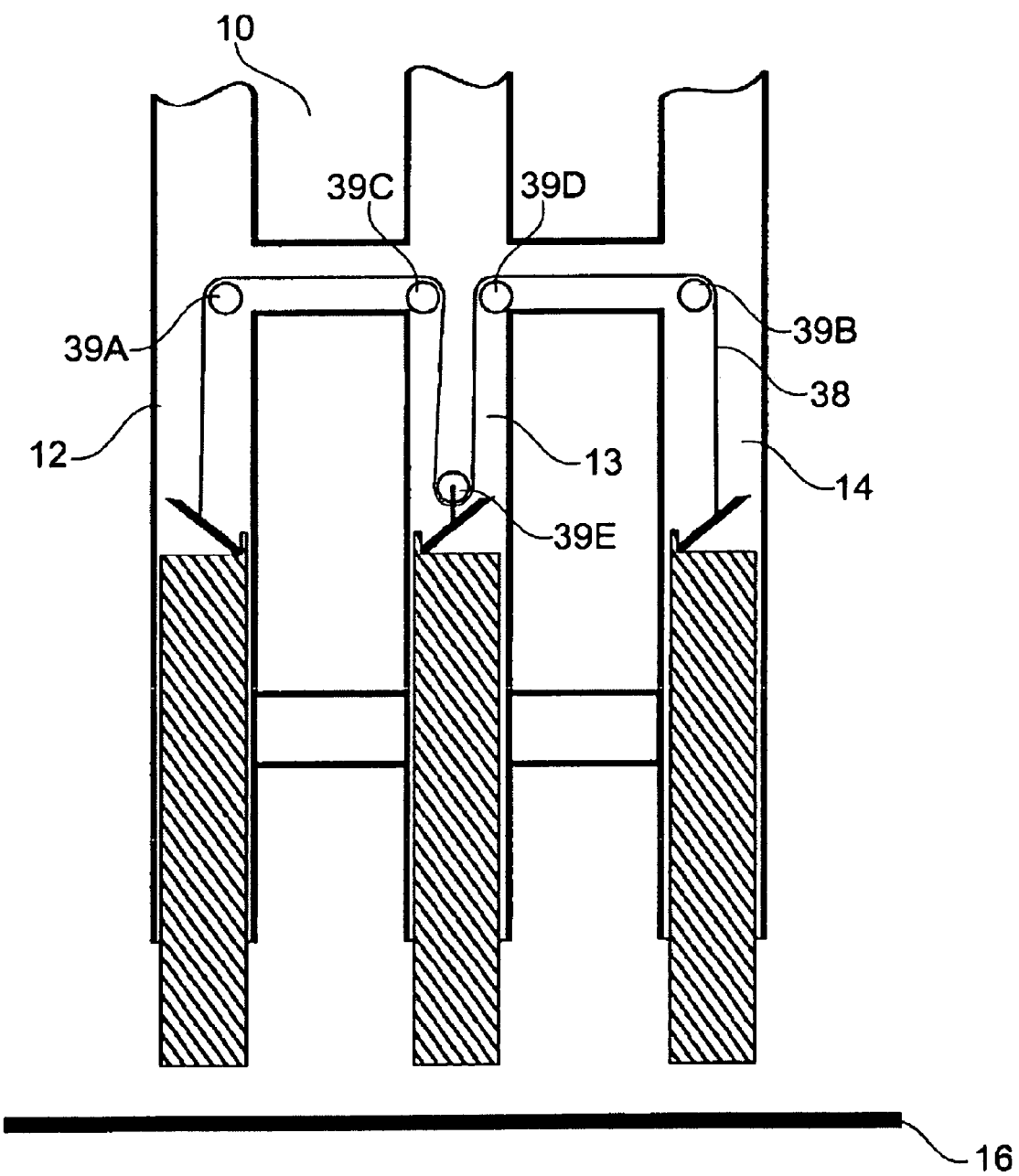

FIG. 3 shows a device 10 with three telescoping legs 12, 13, 14 in order to illustrate how to interconnect the moveable locking members of more than two telescoping legs with each other. The interconnecting principle can be extended to any number of telescoping legs. The operating principle of automatic adjustment of the length of each of the plurality of telescoping legs and of locking all of the telescoping legs so that further insertion of the inner members into the respective outer members of the telescoping logs is prevented by the moveable locking members remains the same as for the device of FIGS. 1 and 2: The flexible member 38 remains strained until all telescoping legs 12, 13, 14 are supported by the supporting surface 16, and the flexible member 38 is not strained when all of telescoping legs 12, 13, 14 are supported by the supporting surface 16. Guiding elements 39C, 39D, and 39E assist in guiding the flexible member 38. The guiding element 39E is mounted on the moveable third locking member.

Figure 4:
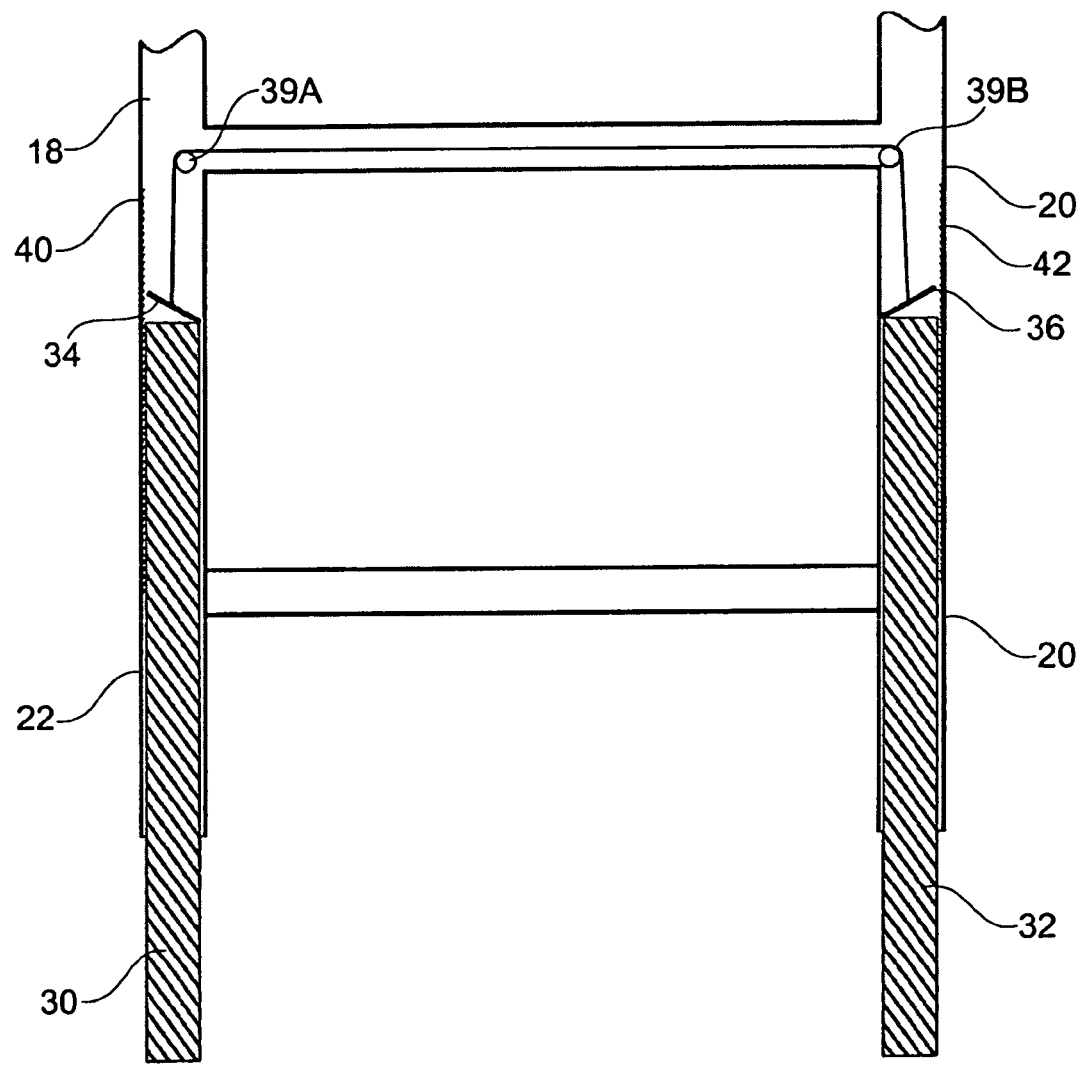

As shown in FIG. 4, the wall 22, 24 of the outer member 18, 20 of the telescoping legs 12, 14 may have an inner surface 40, 42 facing the respective locking member 34, 36 with a roughness facilitating wedging engagement between the locking member 34, 36 and the respective inner surface 40, 42 of the wall 22, 24.

Figure 5:
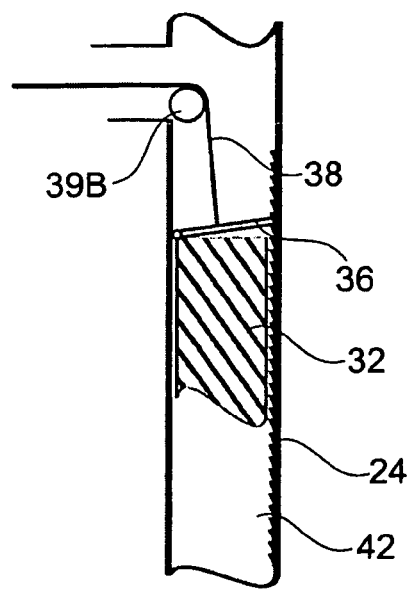
Figure 6:
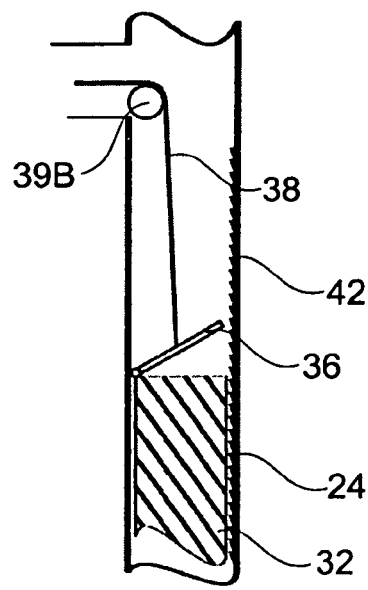

In the example shown in FIG. 4, the roughness is constituted by alternating protrusions and recesses of the surface 40, 42. This is shown in detail in FIG. 5 showing the locking member in the locked position and in FIG. 6 showing the locking member in the unlocked position. In FIG. 4-6, the surface roughness is constituted by a serrated surface.

Figure 7:
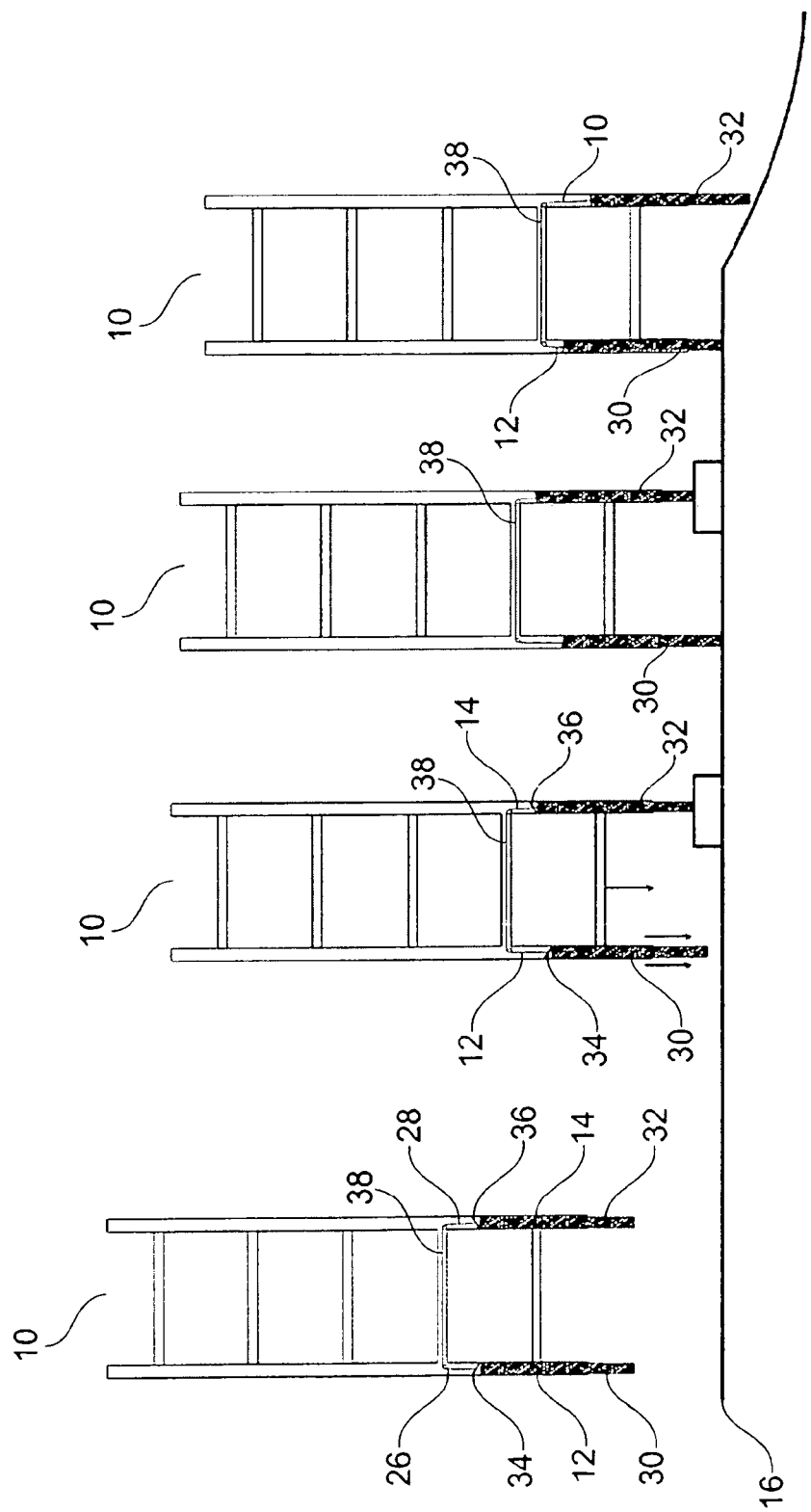

FIG. 7 further illustrates the positioning of the device 10 on an uneven surface 16. In the left most figure, the device 10 is held above the surface 16 whereby gravity keeps the moveable locking members 34, 36 in open positions by pulling the inner members 30, 32 of the telescoping legs 12, 14 downward thereby straining the flexible member 38 that carries the weight of the inner members 30, 32 and the moveable locking members 34, 36. In the next figure to the right, the right telescoping leg 14 is supported by the uneven surface 16 while the left telescoping leg 12 is not yet supported by the uneven surface 16 and thus, when the device 10 is further lowered towards the surface 16, the inner member 32 of the right telescoping leg 14 is further displaced into the cavity 28 of the right telescoping leg 14 while the inner member 30 of the left telescoping leg 12 is further extended out of the cavity 26 of the left telescoping leg 12 until it is finally supported by the uneven surface 16 as shown in the next figure to the right. Allowing the device 10 to rest with its entire weight on the surface 16 makes the moveable locking members 34, 36 turn into their locked positions in which they are wedged between the respective inner member 30, 32 and the respective wall 22, 24 so that further insertion of the inner members 30, 32 into the respective cavities 26, 28 is prevented and the device 10 thus is firmly supported on the surface 16, in the illustrated example, the length of the left telescoping leg is longer than the length of the right telescoping leg. In the rightmost figure, the device 10 rests on another uneven surface resulting in the length of the right telescoping leg being the longest.

Figure 8:
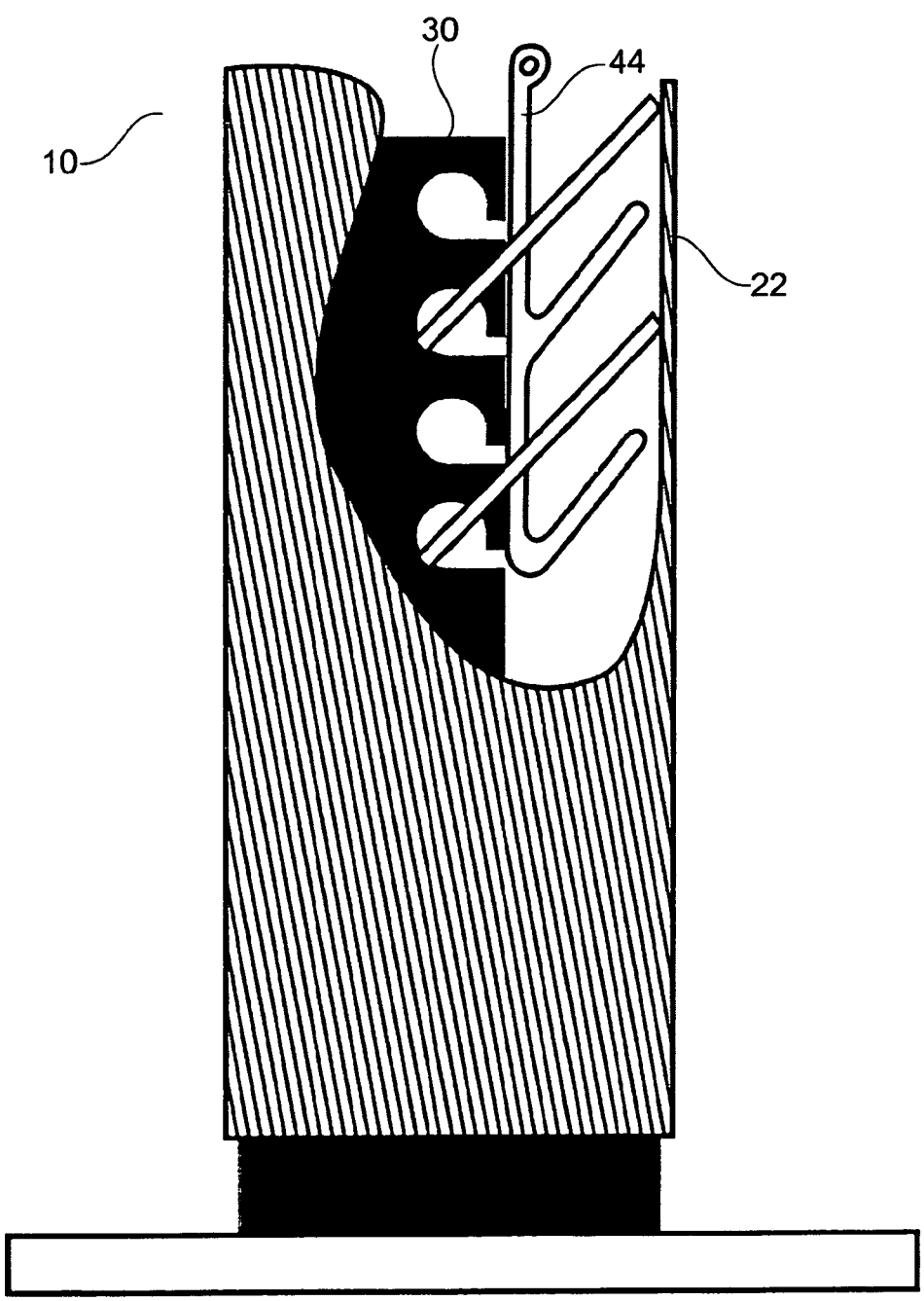
Figure 9:
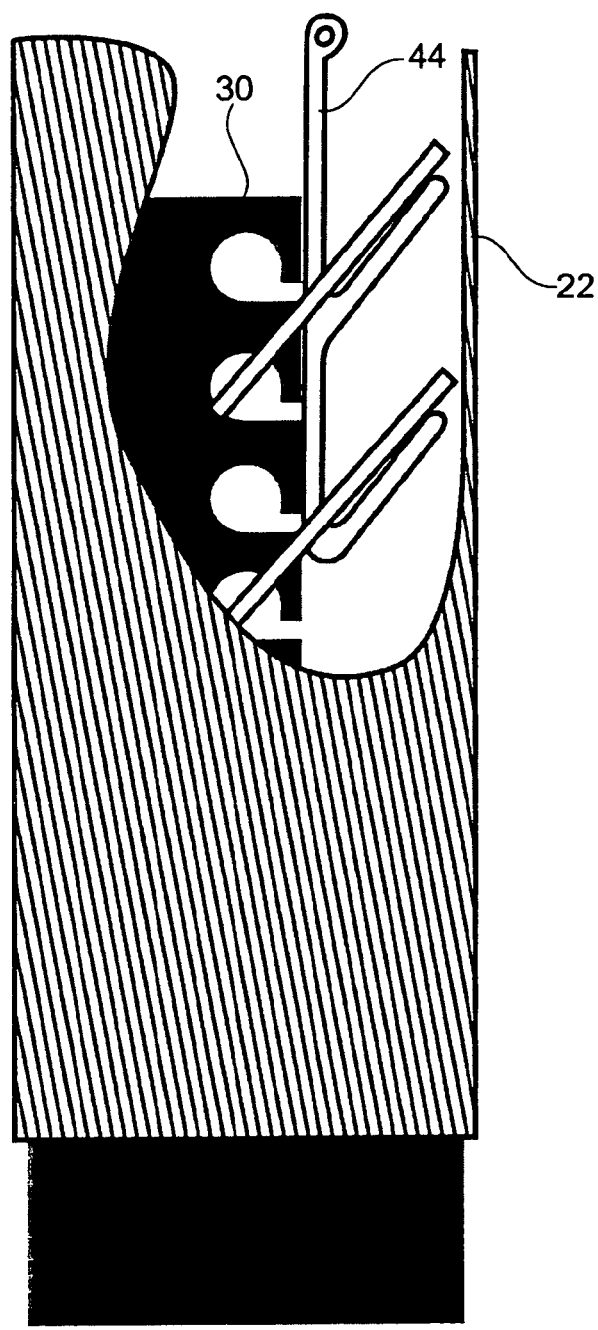
Figure 10:
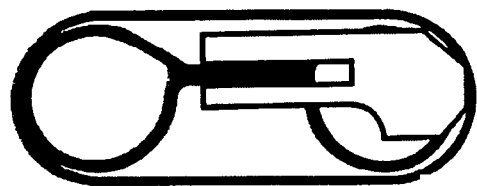
FIG. 10 is a top view of a locking member in the locked position.
Figure 11:
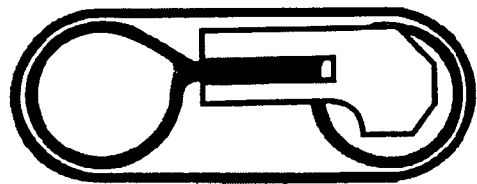
FIG. 11 is a top view of the locking member of FIG. 10 in the unlocked position.
Figure 12:
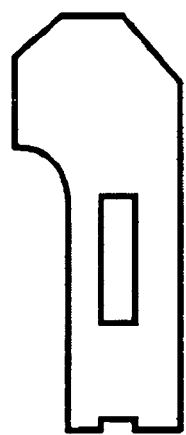
FIG. 12 is a top view of the locking member of FIGS. 10 and 11.
Figure 13:
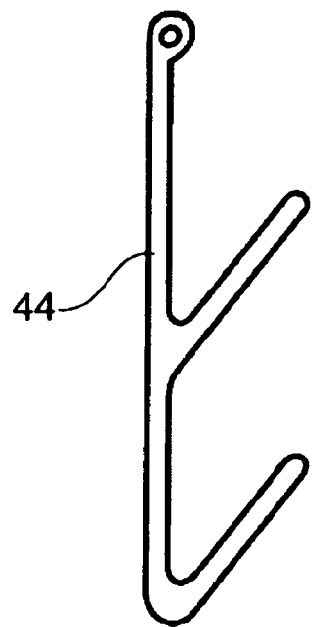
FIG. 13 is a side view of a lock assist member, FIG. 14 schematically illustrates parts of a telescoping leg with a coil spring, FIG. 15 schematically illustrates a detail of telescoping leg with a coil spring, and FIG. 16 schematically illustrates a detail of telescoping leg with a coil spring.

FIG. 8 is a side view of a detail of a device 10 with two moveable locking members in each telescoping leg and further having a lock assist member 44 interconnecting the flexible member 38 and the locking members. In FIG. 8, the locking members are in their locked positions wedging between the inner member 30 and the wall 22. FIG. 9 shows the device 10 of FIG. 8 with the locking members in unlocked positions. FIG. 10 is a top view of a cross-section of one telescoping leg of the device 10 of FIGS. 8 and 9 with the locking members in the locked positions. Likewise, FIG. 11 is a top view of the cross-section of the telescoping leg of the device 10 of FIGS. 8 and 9 with the locking member in the unlocked positions. FIG. 12 shows one of the locking members in more detail. FIG. 13 shows one of the lock assist members in more detail.

Figure 14:
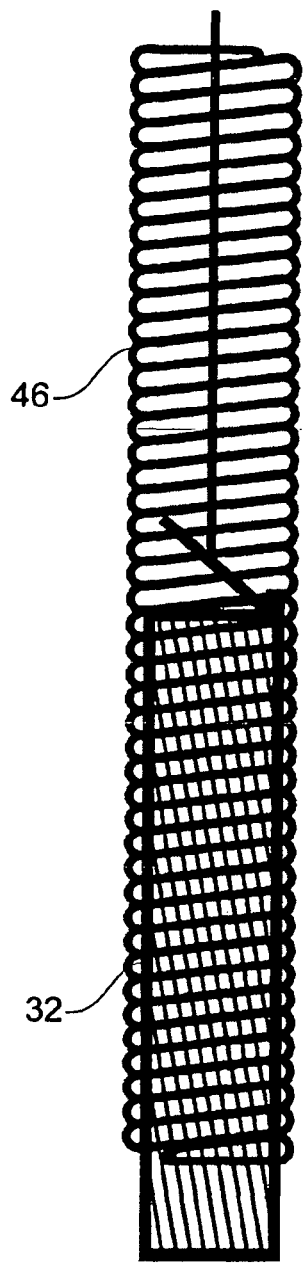
Figure 15:
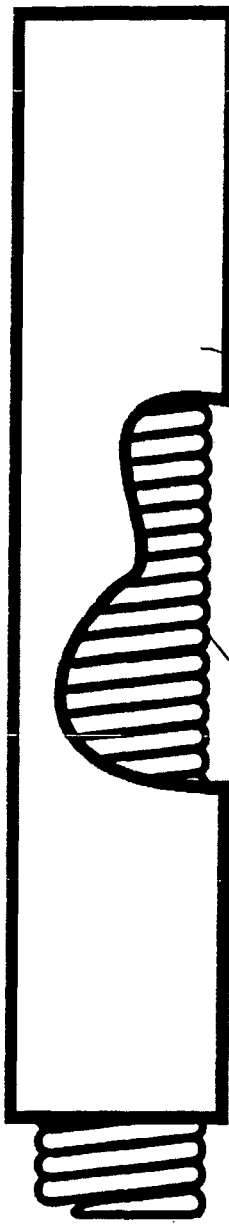
Figure 16:
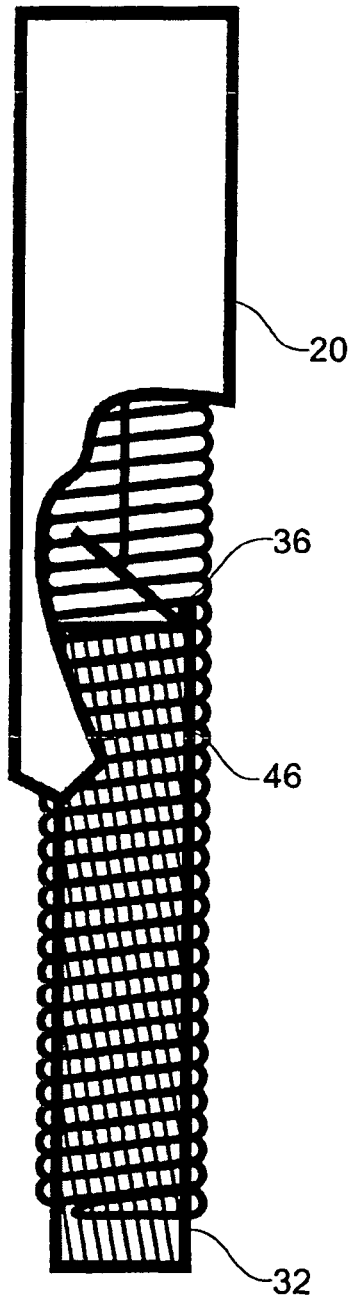

FIGS. 14-16 shows a device 10 in which the desired roughness of the inner surface of the outer member 20 is established by insertion of a coil spring 46 in the cavity 28 of the outer member 20. The coil spring 46 is fastened to the respective wall 24 in the cavity 28 in such a way that the inner member 32 is slidably positioned inside the coil spring 46, and wherein the locking member 36, in the locked position, is wedged in between the respective inner member 32 and the coil spring 46. The spring member 46 may be arranged to apply a force on the inner member in the second direction opposite the first direction in relation to the outer member.

Figures 17, 18:
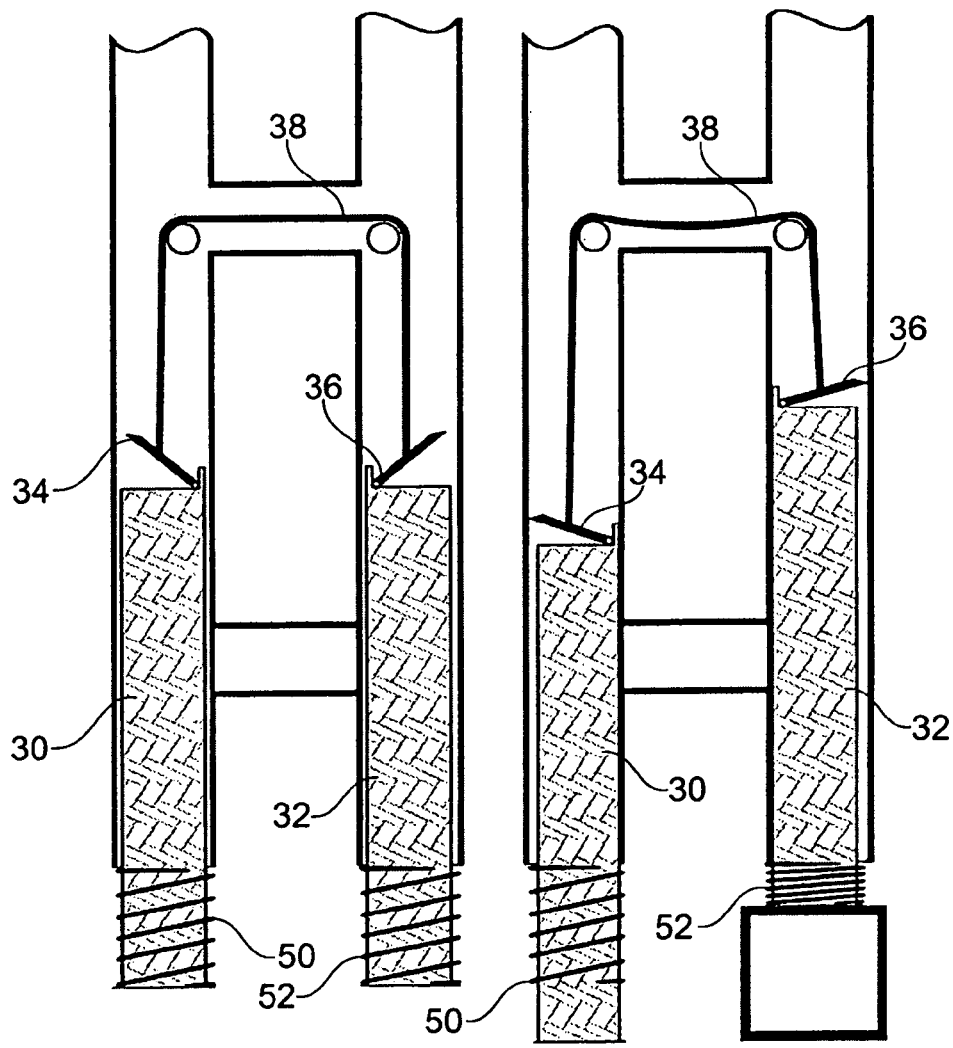
FIGS. 17 and 18 schematically illustrate a further embodiment of an embodiment of the invention.

FIGS. 17 and 18 show an embodiment of the invention including a leg-length adjusting mechanism in the form of compression springs 50, 52 for automatically equalizing the respective lengths of the legs of the device, when the free ends of the slideable leg members 32 are unsupported, as shown in FIG. 17. In the state shown in FIG. 18, the compression spring 52 of the right leg member is compressed under the weight of the ladder. The spring force of the spring is not sufficient to counteract and overcome the gravitational load on the ladder. When the ladder is lifted off ground, the spring 52 however, automatically pushes the right leg member into a length which is equal to the length of the left leg member, i.e. into the state shown in FIG. 17.

The set of legs may include any number of telescoping legs suitable for supporting the device in question, such as two, three, four, six, eight, nine, twelve, fifteen, sixteen, thirty-two, etc., telescoping legs.

The device may be a furniture, such as a table, a chair, a bed, etc., a ladder, a camper, a trailer, a container, such as a cargo container, a container frame, a chopper, a grill, etc.

An uneven surface of the inner wall may be created by welding the outer member, e.g. from outside the outer member.

DESCRIPTION OF FURTHER ASPECTS OF THE INVENTION

Further aspects of the invention are set forth in the following clauses:

1. A device having
a set of legs for supporting the device, the set of legs including at least two telescoping legs, each of which has
an outer member extending along an axis and having a wall at least partly enclosing a cavity inside the outer member,
an inner member slidably positioned within the cavity of the outer member to form the telescoping leg together with the outer member, and
at least one moveable locking member mounted in the telescoping leg in such a way that
each of the at least one moveable locking member, in a locked position, prevents movement of the inner member further into the cavity of the outer member, and
each of the at least one moveable locking member, in an unlocked position, does not prevent movement of the inner member further into the cavity of the outer member,
the device further comprising
a flexible member interconnecting each of the at least one locking members of the at least two telescoping legs and pulling each of the at least one locking members of the at least two telescoping legs into the unlocked position when strained.

2. A device according to clause 1, wherein the flexible member is strained when at least one of the at least two telescoping legs is unsupported.

3. A device according to clause 2, wherein each of the at least one locking members is connected to the respective inner member, and wherein the flexible member is strained by gravity when at least one of the at least two telescoping legs is unsupported.

4. A device according to any of the preceding clauses, wherein the flexible member is not strained when all of the at least two telescoping legs are supported and only subjected to the force of gravity.

5. A device according to any of the preceding clauses, wherein each of the at least one locking member is in the locked position when the flexible member is not strained and the at least two telescoping legs are only subjected to the force of gravity.

6. A device according to any of the preceding clauses, wherein each of the at least one moveable locking member is connected to the inner member in such a way that the at least one moveable locking member is moved from an unlocked position to the locked position by the force of gravity when the flexible member is not strained.

7. A device according to any of the preceding clauses, wherein each of the at least one locking member, in the locked position, is wedged in between the inner member and the wall of the outer member.

8. A device according to clause 7, wherein the wall of the outer member has an inner surface facing each of the at least one locking member, and wherein the inner surface has a roughness facilitating wedging engagement between each of the at least one locking member and the inner surface of the wall.

9. A device according to clause 8, wherein the roughness is constituted by alternating protrusions and recesses of the surface.

10. A device according to clause 7, wherein each of the telescoping legs comprises a coil spring fastened to the wall in the cavity of the outer member, and wherein the inner member is slidably positioned inside the coil spring, and wherein each of the at least one locking member, in the locked position, is wedged between the inner member and the coil spring.

11. A device according to any of the preceding clauses, wherein each of the telescoping legs comprises a lock assist member that interconnects the flexible member and the at least one locking member.

12. A device according to any of the preceding clauses, wherein the set of legs includes at least three telescoping legs.

13. A device according to clause 12, wherein the set of legs includes at least four telescoping legs.

14. A device according to any of the preceding clauses, wherein the at least one moveable locking member includes at least two moveable locking members.

15. A device according clause 14, wherein at least two of the at least two moveable locking members, each in their respective locked position, are in at least two different orientations.

16. A ladder comprising a device according to any of the preceding clauses.

17. A chair comprising a device according to any of the clauses 1-15.

18. A table comprising a device according to any of the clauses 1-15.

19. A camper comprising a device according to any of the clauses 1-15.

20. A grill comprising a device according to any of the clauses 1-15.

21. A container comprising a device according to any of the clauses 1-15.

22. A container frame comprising a device according to any of the clauses 1-15.

23. A scaffolding system comprising a device according to any of the clauses 1-15.

The invention claimed:

1. A device having
   a set of legs for supporting the device, the set of legs including at least two legs, each of which has a slidable leg part slidably positioned with respect to another part of the device to form a leg having an adjustable length;
   a locking structure arranged to prevent movement of each of the slidable leg parts with respect to said other part of the device in a locked state of the locking structure, and to allow movement of each of the slidable leg parts with respect to said other part of the device in an unlocked state of the locking structure,
   a flexible member interconnecting the slidable leg parts, the flexible member being arranged such that it pulls the locking structure into the unlocked position when strained;
wherein
   the locking structure comprises at least two movable locking members, each of which is hingeably connected to respective ones of the slidable leg parts,
   the flexible member has one end attached to a first one of the locking members and another end attached to a second one of the locking members, so that said locking member fall under the action of gravity into a locked engagement with said other part of the device, when said flexible member is unstrained, and so that said locking members are pulled out of the said locked engagement, when said flexible member is strained by gravity acting on the weight of at least one of the slidable leg parts when unsupported.

2. A device according to claim 1, wherein the flexible member is arranged such that it is strained when a free end of at least one of the slidable leg parts is unsupported.

3. A device according to claim 1, wherein the flexible member is arranged such that it is unstrained when the respective free ends of all of the slidable leg parts rest on a supporting surface.

4. A device according to claim 1, wherein each of said legs is a telescoping leg, and wherein said other part of the device is an outer leg member of said telescoping leg, the outer member extending along an axis and having a wall at least partly enclosing a cavity inside the outer member, and wherein each of the slidable leg parts forms an inner member slidably positioned within the cavity of the outer member to form the telescoping leg together with the outer member.

5. A device according to claim 1, wherein each of the locking members is mounted in the telescoping leg in such a way that:
   each of the at least one movable locking member, in a locked position, prevents movement of the inner member further into the cavity of the outer member, and
   each of the at least one movable locking member, in an unlocked position, does not prevent movement of the inner member further into the cavity of the outer member.

6. A device according to claim 5, wherein each of the at least one moveable locking member is connected to the inner member in such a way that the at least one moveable locking member is moved from an unlocked position to the locked position by the force of gravity when the flexible member is not strained.

7. A device according to claim 5, wherein each of the at least one locking member, in the locked position, is wedged in between the inner member and said wall of the outer member.

8. A device according to claim 7, wherein the wall of the outer member has an inner surface facing each of the at least one locking member, and wherein the inner surface has a roughness facilitating wedging engagement between each of the at least one locking member and the inner surface of the wall.

9. A device according to claim 8, wherein the roughness is constituted by alternating protrusions and recesses of the surface.

10. A device according to claim 7, wherein each of the telescoping legs comprises a coil spring fastened to the wall in the cavity of the outer member, and wherein the inner member is slidably positioned inside the coil spring, and wherein each of the at least one locking member, in the locked position, is wedged between the inner member and the coil spring.

11. A device according to claim 5, wherein each of the telescoping legs comprises a lock assist member that interconnects the flexible member and the at least one locking member.

12. A device according claim 5, wherein at least two of the at least two moveable locking members, each in their respective locked position, are in at least two different orientations.

13. A device according to claim 1, further comprising a leg-length adjusting mechanism for automatically adjusting the respective lengths of the legs of the device, when the free ends of the slideable leg parts are unsupported.

* * * * *